United States Patent
Lee et al.

(10) Patent No.: US 10,033,785 B2
(45) Date of Patent: Jul. 24, 2018

(54) CLOUD POWERED SYSTEM ENABLING MOBILE DEVICES TO CONTROL PERIPHERALS WITHOUT DRIVERS

(71) Applicant: North Carolina State University, Raleigh, NC (US)

(72) Inventors: Kyunghan Lee, Cary, NC (US); Injong Rhee, Apex, NC (US)

(73) Assignee: NORTH CAROLINA STATE UNIVERSITY, Raleigh, NC (US)

( * ) Notice: Subject to any disclaimer, the term of this patent is extended or adjusted under 35 U.S.C. 154(b) by 471 days.

(21) Appl. No.: 14/401,513

(22) PCT Filed: May 16, 2013

(86) PCT No.: PCT/US2013/041398
§ 371 (c)(1),
(2) Date: Nov. 14, 2014

(87) PCT Pub. No.: WO2013/173611
PCT Pub. Date: Nov. 21, 2013

(65) Prior Publication Data
US 2015/0142919 A1    May 21, 2015

Related U.S. Application Data

(60) Provisional application No. 61/648,056, filed on May 16, 2012.

(51) Int. Cl.
*G06F 15/16* (2006.01)
*H04L 29/06* (2006.01)
(Continued)

(52) U.S. Cl.
CPC .............. *H04L 65/60* (2013.01); *H04L 67/04* (2013.01); *H04L 67/2814* (2013.01);
(Continued)

(58) Field of Classification Search
None
See application file for complete search history.

(56) References Cited

U.S. PATENT DOCUMENTS

2007/0264991 A1    11/2007 Jones et al.
2008/0151847 A1    6/2008 Abujbara
(Continued)

FOREIGN PATENT DOCUMENTS

EP    1 189 398 B1    3/2004

OTHER PUBLICATIONS

Amazon Web Services, "Amazon Elastic Compute Cloud (Amazon EC2)," http://aws.amazon.com/ec2/, pp. 1-8 (Mar. 12, 2015).
(Continued)

*Primary Examiner* — Brian Whipple
*Assistant Examiner* — Anthony T Rotolo
(74) *Attorney, Agent, or Firm* — Jenkins, Wilson, Taylor & Hunt, P.A.

(57) ABSTRACT

Smart devices including smart phones and tablets are getting more powerful and become versatile enough to replace conventional personal computers. Despite the rapid evolution of capabilities of such devices, controlling peripherals such as networked printers is infeasible due to lack of dedicated drivers to communicate with peripherals. To immediately enable smart devices to operate peripherals, a cloud-powered system, CloudBridge, is suggested. A CloudBridge application miming on a smart device works as a TCP bridge relaying packets between two TCP tunnels connected to a networked peripheral on one side and a cloud server on the other side. Through the bridge, issuing operations from a smart device without having drivers becomes possible by asking the cloud server to interpret the operations to a language that the peripheral can understand, CloudBridge further optimizes user experience by using data
(Continued)

compression that is adaptively applied by a decision function. The system implemented in Android phones and Linux servers is demonstrated to control networked printers on smart phones and tablets. The decision function is shown to optimize QoE metrics, such as response time and energy consumption though extensive evaluations.

16 Claims, 16 Drawing Sheets

(51) Int. Cl.
    *H04L 29/08*     (2006.01)
    *G06F 3/12*      (2006.01)
(52) U.S. Cl.
    CPC ............ *H04L 69/04* (2013.01); *G06F 3/1204* (2013.01); *G06F 3/1228* (2013.01); *G06F 3/1236* (2013.01); *G06F 3/1288* (2013.01); *H04L 67/12* (2013.01)

(56) References Cited

U.S. PATENT DOCUMENTS

| | | | |
|---|---|---|---|
| 2011/0022812 A1 | 1/2011 | Van der Linden et al. | |
| 2011/0096354 A1* | 4/2011 | Liu ...................... | G06F 3/1204 358/1.15 |
| 2011/0194140 A1 | 8/2011 | Sweet et al. | |
| 2011/0279863 A1* | 11/2011 | Chang ................... | G06F 3/1204 358/1.15 |
| 2012/0038948 A1 | 2/2012 | Park | |
| 2012/0182573 A1* | 7/2012 | Mok ...................... | G06F 3/1204 358/1.15 |
| 2013/0100486 A1* | 4/2013 | McCoog ............... | G06F 3/1204 358/1.15 |
| 2013/0100487 A1* | 4/2013 | Busch ................... | G06F 3/1206 358/1.15 |
| 2013/0275615 A1* | 10/2013 | Oyman .................. | H04L 65/60 709/231 |

OTHER PUBLICATIONS

Apple Inc., "AirPrint, Wireless printing, right from your iPhone," http://www.apple.com/iphone/features/airprint.html, pp. 1-3 (Mar. 11, 2015).
Gobry, "Analyst: Smartphone Sales Will Dwarf PC Sales This Year And Reach A Staggering 1.5 Billion Per Year By 2016," Business Insider, http://www.businessinsider.com/smartphone-sales-forecast-2012-2, pp. 1-2 (Feb. 29, 2012).
Canalys, "Smart phones overtake client PCs in 2011," Press Release 2012/021, http://www.canalys.com, pp. 1-4 (Feb. 3, 2012).
Epson, "Epson Connect—Wireless Printing, Printers, and Apps," http://www.epson.   com/cgi-bin/Store/jsp/epson-connect.do?BV_UseBVCookie=yes, pp. 1-3 (Mar. 11, 2015).
Google, "How Does Google Cloud Print Work," http://www.google.com/cloudprint /learn/howitworks.html, pp. 1-3 (Mar. 11, 2015).
HP, "HP Mobile Printing," HP Mobile Printing from a Smartphone or Tablet, http://www8.hp.com/us/en/ads/mobility/overview.html, pp. 1-12 (Mar. 11, 2015).
HP Support Center, "HP Officejet, HP Deskjet, HP Business Inkjet, HP Color Inkjet—PCL 3 and PCL 5/6 Features and Differences," http://h20564.www2.hp.com/hpsc/doc                 /public/display?docId=emr_na-000068221, pp. 1-3 (Mar. 12, 2015).
IDC, "Worldwide Large Format Printer Market Returned to Year-Over-Year Growth in the Third Quarter of 2013 According to IDC," IDC Press Release, http://www.idc.com/getdoc/jsp?containerId=prUS24472213, pp. 1-3 (Dec. 13, 2013).
Kodak, "Welcome to Intelligent Printing," Kodak Cloud Printing Services, http://www.kodak.com/ek/, pp. 1-2 (Mar. 11, 2015).
Monsoon Solutions Inc., "Power Monitor," http://www.msoon.com/LapEquipment/PowerMonitor/, p. 1 (Mar. 11, 2015).
PrinterShare, "Mobile Printing," http://printershare.com/mobile.sdf, pp. 1-2 (Mar. 11, 2015).
Samsung Mobile Print, "Print, Scan and Transfer On the Go with the Samsung Mobile Print App," http://www.samsung.com/us/mobile-print-app/ pp. 1-5 (Mar. 11, 2015).
Cleary et al., "Data Compression Using Adaptive Coding and Partial String Matching," IEEE Transactions on Communications, vol. Com-32, No. 4, pp. 396-402 (Apr. 1984).
Moffat et al., "Implementing the PPM Data Compression Scheme," Transactions Letters, IEEE Transactions on Communications, vol. 38, No. 11, pp. 1917-1921 (Nov. 1990).
Vitter et al., "Optimal Prefetching via Data Compression," Journal of the ACM, vol. 43, No. 5, pp. 771-793 (Sep. 1996).
Arthur, "How the smartphone is killing the PC," The Guardian, http://www.theguardian.com/technology/2011/jun/05/smartphones-killing-pc/print, pp. 1-6 (Jun. 5, 2011).
Chen et al., "Analysis of Branch Prediction via Data Compression," ACM SIGOPS Operating Systems Review, ASPLOS VII 10/96, pp. 128-137 (Dec. 1996).
Notification of Transmittal of the International Search Report and the Written Opinion of the International Searching Authority, or the Declaration for International Application No. PCT/US2013/041398 (dated Aug. 14, 2013).

* cited by examiner

CLOUD POWERED SYSTEM ENABLING MOBILE DEVICES TO CONTROL PERIPHERALS WITHOUT DRIVERS

PRIORITY CLAIM

This application claims the benefit of U.S. Provisional Patent Application Ser. No. 61/648,056, filed May 16, 2012; the disclosure of which is incorporated herein by reference in its entirety.

TECHNICAL FIELD

The subject matter described herein relates to controlling peripherals using mobile devices. More particularly, the subject matter described herein relates to a cloud powered system for enabling mobile devices to control peripherals without drivers.

BACKGROUND

Smart devices including smartphones and tablets are becoming more and more prevalent in our lives. According to a report [4], the total shipments of smart phones and tablets during 2011 were 550.9 million units. The number is already higher than 351.4 million units, the total shipments of conventional personal computers (PCs) including desktop, laptop, and netbook. While the market for smart devices is growing dramatically, the capabilities of such devices have also been revolutionized during recent years. Many survey results from business sectors [3], [4], [14] show that smart devices started to replace conventional computers in daily computing leveraging their unique strengths such as dedicated applications, faster operations via finger touches, lighter weight, and longer battery time. However, there is a known critical limitation of smart phones in replacing conventional computers. That is lack of peripheral support. Smart devices are not able to talk to peripherals such as networked printers, scanners, cameras because the manufacturers of such peripherals do not provide dedicated drivers for smart devices. The limitation can be mitigated by waiting the manufactures to release dedicated drivers or porting drivers developed for PCs to smart devices. However, both approaches are not universally applicable to all peripherals. To address the problem, we propose a networked system leveraging cloud computing, which we call CloudBridge for smart devices.

SUMMARY

According to one aspect, the subject matter described herein includes a method for accessing a service from a peripheral device using a mobile device. The method includes using, an application on a first mobile device, discovering, a peripheral from which a user of the first mobile device desires to access a service. The method further includes receiving a content stream or a compressed content stream from a server to be delivered to the peripheral and for which the service is to be invoked. The method further includes performing header assembly or decompression of the content stream. The method further includes relaying the content stream to the peripheral or to a second mobile device.

The subject matter subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single device or computing platform or may be distributed across plural devices and computing platforms.

BRIEF DESCRIPTION OF THE DRAWINGS

Preferred embodiments of the subject matter described herein will now be explained with reference to the accompanying drawings, of which:

FIG. 9 illustrates compression time on the CloudBridge server ($t_c$) and the polynomial regression function to the print stream size: $t_c=1.45e^{-4}x^2+0.1379x+0.1464$. The print stream is the input file for the compression;

FIG. 10 illustrates decompression time on the Android device ($t_d$) and the polynomial regression function to the print stream size: $t_d=9.51e^{-3}x^2+7.26e^{-2}x+0.7218$. Print stream is the output file from the decompression;

DETAILED DESCRIPTION

Figure 1:
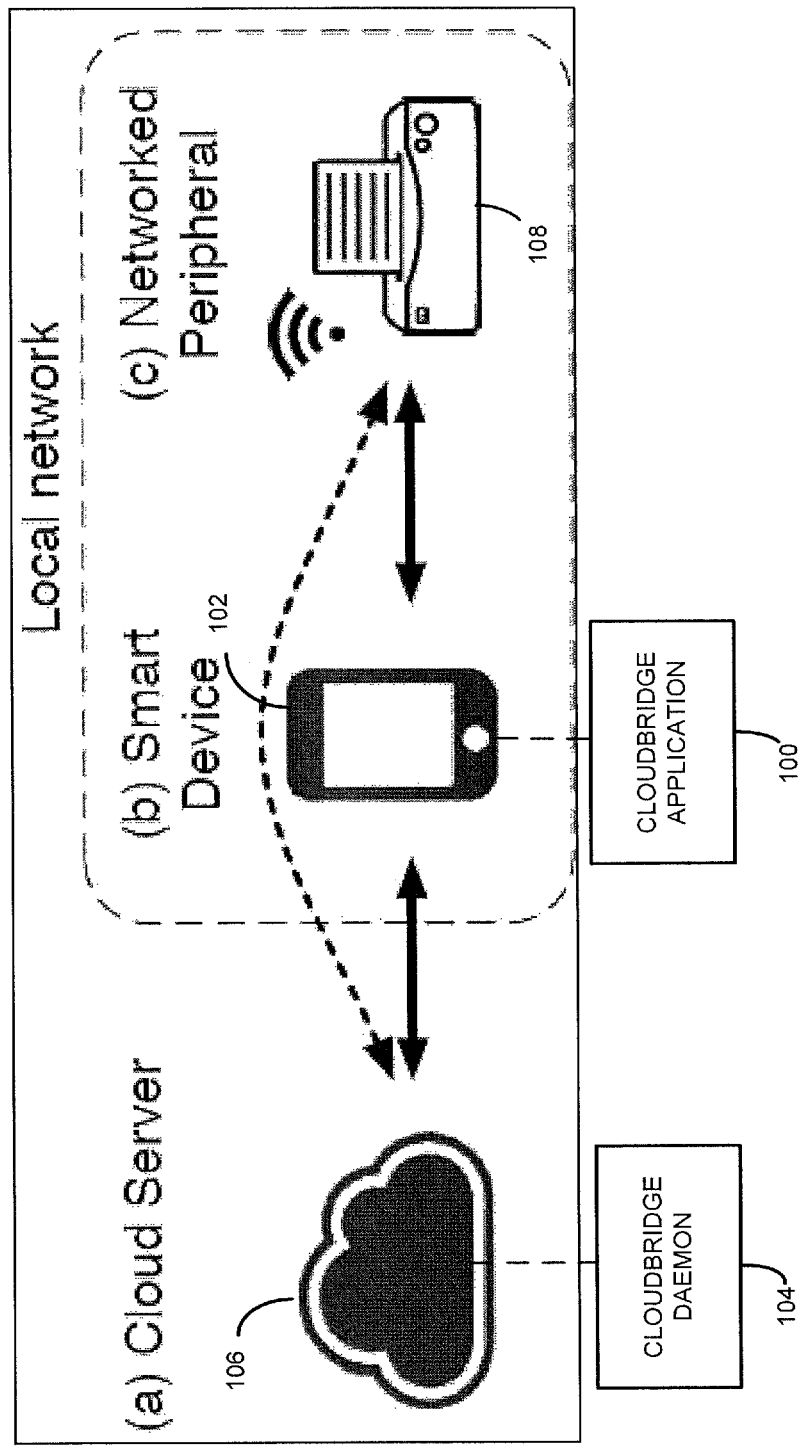
FIG. 1 is a block diagram of a system for controlling peripherals from a mobile device using a mobile device without drivers according to an embodiment of the subject matter described herein.

CloudBridge enables peripheral support in smart devices in a way that is universally applicable and completely independent from local PCs. It also provides indistinguishable experiences to users while controlling peripherals comparing to that from a conventional PC. The CloudBridge system includes an application 100 for a smart device 102 and a daemon 104 for a cloud server 106. As shown in FIG. 1, application 100 running on smart device 102 sets up TCP sockets to peripheral 108 and to cloud server 106 with the CloudBridge daemon 104. Using the sockets connecting both sides, CloudBridge application 100 configures smart device 102 to operate as a transparent bridge, allowing cloud server 106 with an appropriate driver to talk to the peripheral 108. Since cloud server 106 is assumed to have drivers for all candidate peripherals in the market and is controlled by application 100, the peripherals become immediately accessible from smart device users. The proposed system can be used to operate networked printers or any other peripheral accessible to smart devices over a network. Despite its simple yet efficient system architecture, our implementation using Android smart phones and Linux PCs reveals critical challenges in the system for its practicality.

When CloudBridge is used to control networked printers, cloud server 106 obtains the information of printer 108 discovered around smart device 102 and a file to print chosen in smart device 102. Then server 106 interprets the file into a print stream written in a printer language, PCL (printer command language) using a proper driver that the target printer can understand. A challenge observed in the system is that the size of the print stream becomes huge ranging from a few times to a few hundred times of the original file size. Given that our system relies on networking to deliver the stream to the printer, the increased size directly affects the user experiences such as the total time duration to get the print outs and the energy consumption of smart device 102.

To address the challenge, we investigate the characteristics of the printer stream and adopt a compression technique, which shows the best compression efficiency for the printer streams out of a large number of candidates. The adoption of compression brings trade-offs in the total print time and the energy consumption because compression and decompression also demand time and energy. For the optimal use of compression, we model and present a decision function optimizing user experiences by determining whether to apply compression or not. We perform extensive experiments with more than a thousand printer models from major printer vendors, whose drivers are installed in our cloud server. The results show that the ratio between the total print time of our system and the time using a conventional PC converges to $B_p/B_c+1$ as the file size gets larger, where $B_p$ and $B_c$ denote the network bandwidth to the printer and to the cloud server, respectively. Also, our decision function is verified to provide the best experience to users in 95% of the time.

Contributions of the subject matter described herein include the following:

We propose a cloud-powered network system, CloudBridge enabling peripheral support in smart devices.

We implement the system in Android smart devices and Linux PCs and demonstrate the efficacy of the system for printing.

We identify a challenge in the printing system and suggest a practical solution to the challenge by adopting a compression technique and its optimal decision function.

This document is organized as follows. In Section 1, we overview related work regarding existing approaches to enable peripheral support in smart devices. We present the detailed architecture and implementation issues of CloudBridge system in Section 2. In Section 3, we extensively evaluate our implemented system and propose a compression decision function in Section 4. Finally, we conclude the work in Section 5.

1. RELATED WORK

In this section, we give special focus on techniques providing a specific peripheral support, printing from smart devices. There have been various techniques enabling printing from smart devices, but the existing techniques do not perfectly achieve our goal, independent, complete, and universal peripheral support for smart devices. We survey the techniques and discuss them in detail.

A printer driver is software that converts digital data into a bit stream, which can be understood by a printer. To operate a printer on a computer, a specific driver needs to be installed beforehand. Since printer manufacturers do not provide dedicated printer drivers to smart devices, there is no intuitive way to operate printers from smart devices. To address the problem, various approaches have been tried. The fact that there are over 300 printing applications in the Android market shows high demand for a solution from users. Current printing solutions including mobile applications available in the market are classified into three categories: 1) printing through a PC connected to a printer, 2) printing through a mobile driver ported from the driver for a PC, and 3) directly printing from a file at the printer.

a) Printing Through a PC:

Most of the applications listed in markets of iOS and Android make use of a local computer connected with a printer via a wired or a wireless connection. Such applications send a file to the computer and ask the computer to print. AirPrint [2] from Apple and CloudPrint [6] from Google adopt this approach. Many Android applications providing printing ability exploit the CloudPrint service from Google. This approach requires a setup procedure by a user and a PC to be always on for printing. We consider this approach does not meet our requirement of independence.

b) Printing Through a Mobile Driver:

To enable independent operation from a PC when printing from smart devices, another approach has been tried. Several companies such as PrinterShare [12] and the printer manufacturer Samsung [13] provide applications with printer drivers converted for smart devices from the drivers originally developed for PCs. This approach immediately allows smart devices to operate printers; however, the number of supported printers is very limited. Also, functional limitations may exist since the drivers are not dedicated especially when the conversion is not done by the manufacturer. Some proprietary functions may not be accessible. This approach lacks universal support.

c) Printing at a Printer:

Another approach mainly provided by printer manufacturers is printing a file directly at a printer without any help of a PC or a smart device. Printer manufacturers call the technique, driver-less printing and recently launched a set of printers supporting the feature. In this approach, a smart device is only required to send a file to a printer over a network, then the printer itself interprets the file into a bit stream it can understand. HP ePrint printers [7], Kodak Hero series [10] and the latest Epson models [5] are examples of driver-less printers. This approach is desirable in that it does not put any burden on smart devices. In addition, this approach cannot provide universal support as most of the printers without such a feature cannot be utilized at all. More importantly, the approach has a fundamental limitation in supporting various file types, lacking the completeness. We cannot expect a printer to support all possible advanced file formats specific to advanced applications such as CAD, PSD, MAT, KEY, and PPTx. Printing such files still requires a PC.

Table I summarizes features of the existing printing techniques compared with our proposed system, CloudBridge. As shown in the table, our approach relying on a cloud server satisfies all key features, it is independent, complete, and universal. Until most of the printers understand almost all popular file formats without help of a PC, our proposed system can benefit smart devices.

TABLE I

| Solutions | Independence from PCs | Complete file type support | Universal printer support |
| --- | --- | --- | --- |
| Printing via a PC [2], [6] | X | O | O |
| Printing with ported drivers [12], [13] | O | X | X |
| Driver-less printers [5], [7], [10] | O | X | X |
| CouldBridge | O | O | O |

Mobile printing solutions in the market and their characteristic classification based on three features. CloudBridge satisfies all key features: it provides independent, complete, and universal peripheral support.

2. CLOUDBRIDGE SYSTEM

In this section, we provide a high level overview of our proposed system and present its detailed architecture. Descriptions for the key components of our system follow.

A. Overview

The CloudBridge system includes two major entities, (1) a CloudBridge application for smart devices and (2) a CloudBridge daemon for a cloud server. In one exemplary implementation, our system includes the following 6 steps of operation: 1) A smart device broadcasts a printer discovery query to a subnet or to a specific IP address and 2) gets the response back from one or more printers. 3) The smart device asks a user to choose a printer and a file to print and then forwards the corresponding response from the selected printer along with the selected file to our cloud server using a TCP socket. 4) The cloud server interprets the file into the print stream that the selected printer can understand using the matching driver in its database and 5) sends the stream back to the smart device. 6) Finally, the smart device forwards the stream to the selected printer through another TCP socket established with the printer.

In our system, the bidirectional TCP bridge between two sockets lying in both directions is the key component. Smart phones with the bridge can handle more diverse operations, such as error messages delivered from the printer or the server. Messages from printers will be forwarded to the server, where they are interpreted to human-readable message, and will come back to the smart device for notification.

Leveraging this bridge, our system provides immediate benefits to smart device users. However, potential performance degradation may appear because the interpreted data turns out to be much larger in size than the original data. For instance, when a file is converted to a print stream using a printer language such as PCL (printer command language) 4 or PCL 5, the stream size becomes 50 to 100 times of the original file size depending on the file type and contents. The most recent version of printer language, PCL 6 reduces the inflation to less than 10 but the oversize issue still remains. To mitigate the impact of this issue, we adopt a decision function in the server to determine whether to compress the stream or not depending on the network bandwidth and the stream size. The decision function optimizes the end-to-end delay of a print job as well as energy consumption in the smart device. The function is trained from multiple runs of printing operations and once modeled from the training, it starts providing its decision. Our extensive evaluation on the decision function is given in Section 4.

B. System Architecture

Figure 2:
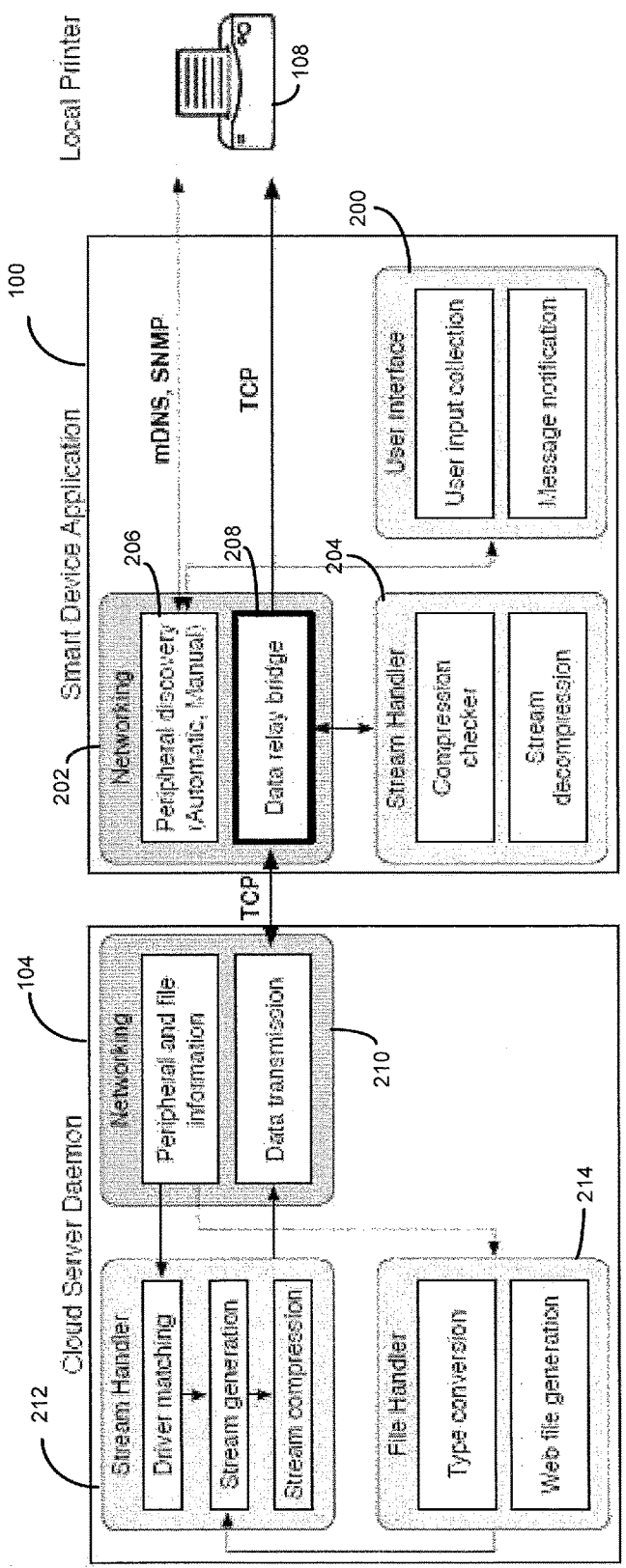
FIG. 2 is a block diagram illustrating an exemplary architecture of a system for controlling peripherals without drivers according to an embodiment of the subject matter described herein.

The software architectures of two major components, CloudBridge application 100 for smart devices 102 and daemon 104 for a cloud server 106 are shown in FIG. 2.

d) CloudBridge Application:

The CloudBridge application 100 configured to execute on smart device 102 is composed of three modules, which are a user-interface module 200, networking module 202, and stream handling module 204. User-interface module 200 collects user input regarding printing options, such as color, duplex, and a preferred performance metric (i.e., energy, time). User-interface module 200 also delivers messages from a printer as well as a server to a user in a human-readable format. Networking module 202 includes two sub-modules, a peripheral discovery module 206 and a data relay module 208. Discovery module 206 uses service discovery protocol such as multicast-DNS (domain name system), DNS-SD (DNS-based service discovery), SSDP (simple service discovery protocol) to find nearby printers, especially printers located in the same subnet. Peripheral discovery module 206 can extend its discovery boundary by specifying an IP address of the target printer using SNMP (simple network management protocol) queries. Data relay module 208 bridges packets from the printer to the cloud server and vice versa. Data relay module 208 listens on TCP sockets for both sides and whenever there are packets coming from one side, it extracts payloads from these packets, encapsulates them to new ones and then forward the packets to the other side. The process of encapsulating the packets into new packets includes header assembly of the new packets, where a new TCP header is created for each new packet and combining the header with the new packet payload. For packets destined for printer 108, header assembly includes inserting the IP address of printer 108 in the packet header, inserting other header parameters, and computing and inserting the checksum. For packets destined for server 106, header assembly includes adding the IP address of server 106 to the header, inserting the other header parameters, and computing and inserting the checksum. Stream handling module 204 selectively works when the payloads in the packets are determined to be compressed. Since the decision on compression is made at cloud server 106, stream handling module 204 passively performs decompression. Algorithm 1 below summarizes the work flow of CloudBridge application 100 running on a smart device. 102 modules, networking module 210 delivers the stream back to smart device 102. Stream handling module 212 is key to the CloudBridge daemon 104. Based on the printer information retrieved from smart device 102, stream handling module 212 finds the matching driver in its database and generates the print stream with the options designated by the smart device user. Upon generation of the print stream, stream handling module 212 makes a decision on whether to compress the stream or not applying a pre-trained decision function based on the network bandwidth and the stream size. Operation of the compression decision function implemented by stream handing module 212 will be described in detail in Section 4. File handling module 214 only intervenes when the daemon receives a file of an advanced format, for example, which cannot be interpreted by the printer driver. In such cases, file handling module 214 selects the corresponding file converter and converts the file into a file of a basic format such as PDF or PS. The print quality is guaranteed after conversion as the converter borrows the conversion ability from full-fledged applications on conventional computers. In some cases where the print file type is platform specific, e.g., only supported on Mac OS X or Windows, file handling module 214 performs the conversion in the corresponding OS virtualized in the cloud server. Once the conversion is done, the converted file is delivered to stream handling module 212 which generates the print stream subsequently. The work flow of CloudBridge daemon 104 is summarized in Algorithm 2 below.

---

Algorithm 1 Pseudo operations of CloudBridge application

Initialization:

if Printer search button selected then
  List the automatic discovery result
  if A printer name selected from the list then
    Set the printer as target device
  else if An IP address entered then
    Operate manual discovery and set as target device
  end if
else if File search button selected then
  List files in the SD card storage
  Set the selected file to print
else if Print start button selected then
  if Target printer and file to print set then
    Start printing process
  end if
end if Printing Process:

Set up TCP socket sock$_1$ with cloud server
Transmit target printer information and file to server
Set up TCP socket sock$_2$ with local printer
if Compressed print stream then
  Receive entire data from server through sock$_1$
  Decompress data into raw print stream
  Transmit stream to printer through sock$_2$
else
  while Receive packet from server through sock$_1$ do
    Transmit packet to printer through sock$_2$
  end while
end if
return

--- e) CloudBridge daemon: CloudBridge daemon 104 running on cloud server 106 includes three modules, which are a networking module 210, a stream handling module 212, and a file handling module 214. Networking module 210 receives printer information along with a file to print from a smart device. Once the print stream is ready from other

---

Algorithm 2 Pseudo operations of CloudBridge daemon

Server daemon:

Accept connection from client and start printing process
Printing process:

Receive printer information and file
if Printer driver matching failed then
  Transmit error message to smart device
  return
end if
Register printer by redirecting the stream to localhost
if File type is advanced application then
  if File type is web address then
    Trigger web file generation to file handling module
  else
    Trigger file type conversion to file handling module
  end if
  Receive converted file from file handling module
end if
Generate print stream by issuing print command
while Receive packet from localhost do
  Receive entire raw print stream
end while
if Decision function returns 1 then
  Compress the raw print stream
  Transmit compressed stream to client
else
  Transmit raw print stream to client
end if
return

---

C. Timeline Diagram

Figure 3:
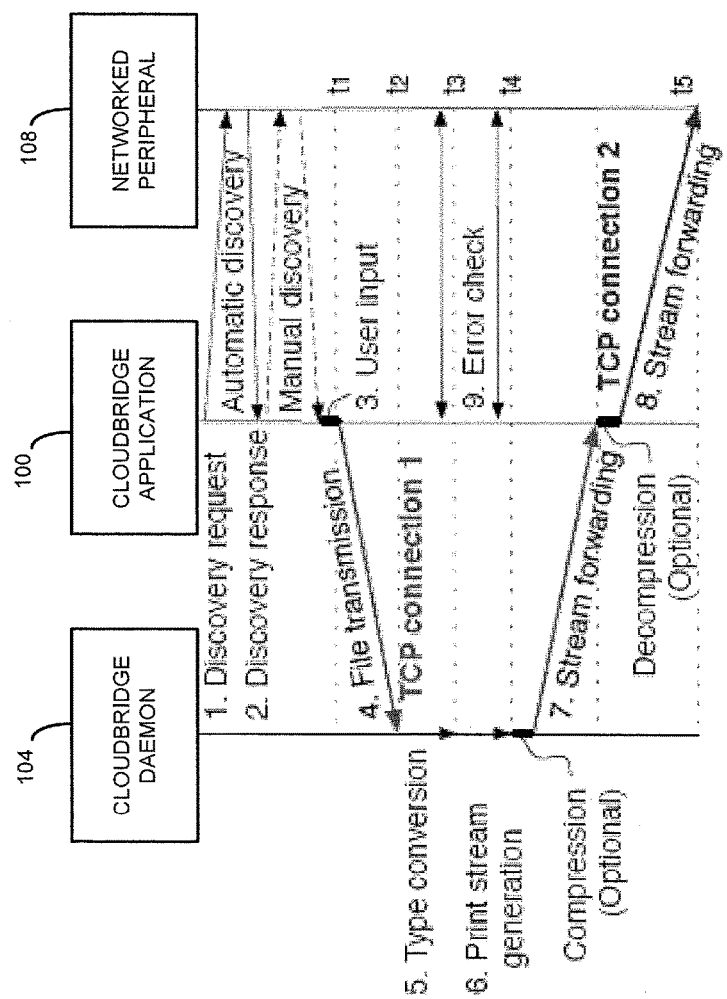
FIG. 3 is a message flow diagram illustrating a communication sequence of CloudBridge according to an embodiment of the subject matter described herein.

Detailed operations between CloudBridge application 100, daemon 104, and printer 108 are illustrated as a timeline diagram in FIG. 3. The operations are sequential in time following the arrows shown in the figure. (1) Smart device application 100 broadcasts a discovery request to all hosts on the same subnet or sends query directly to an IP designated host. (2) On receiving the query, printers, such as printer 108, send responses back containing their printer information. (3) On receiving the responses, application 100 asks the user to select a printer and a file to print, and (4) delivers them all together to cloud server daemon 104. (5) On receiving the file and the printer information, daemon 104 first checks the file type. If the file type is of advanced applications, file handling module 214 converts the file into a basic format. (6) Once the conversion is done, stream handling module 212 interprets it into a print stream. (7) Stream handling module 212 determines whether to compress the stream or not based on the network bandwidth and the size of the stream. Stream handling module 212 then sends the print stream, either after compression or not, back to smart device application 100 through the TCP connection established in (4). (8) On receiving the stream, smart device application 100 decompresses the print stream if the print stream is compressed. Then, smart device application 100 delivers the raw stream to the printer by setting up a new TCP socket. (9) Along with the processes (1)-(8), smart device application 100 periodically sends error queries to printer 108 to check the error status of printer 108, such as lack of paper or toner or incidence of paper jam and provides instant feedback to the user. Smart device application 108 also forwards printer errors to daemon 104 and gets error interpretations back, similar to what the stream handling module 212 does.

3. EVALUATION

In this section, we extensively evaluate our proposed system using various Android smart devices, two actual networked printers, a huge number of emulated printers and a Linux server. The smart devices include Samsung Galaxy S II, LG G2x, and HTC Evo Shift. The actual printers are HP LaserJet 4250 and Brother 2270DW, and the emulated printers include over 1,000 networked printers in total from all major printer manufacturers, such as HP, Canon, Epson, and Samsung. According to a recent article from IDC (International Data Corporation) [9] regarding the world printer market share as of 2011, the major manufacturers cover 80% of the market (i.e., HP (42.9%), Canon (18.1%), Epson (12.6%), and Samsung (5.7%)). We installed drivers for 680 HP printers, 131 Canon printers, 212 Epson printers and 144 Samsung printers, 1,167 in total, on the Linux server for the performance emulation of our system. The smart devices and the printers are located in the U.S. whereas the Linux server working as a remote cloud server is placed in a different continent. For energy measurement, we use a digital power meter from Monsoon [11], which is able to dump the power consumption readings into a PC via USB connection. We use the lowest reading interval of the device, 200 microseconds, to measure the most accurate energy consumption in the smart devices.

A. Operation Time Analysis

Figure 5:
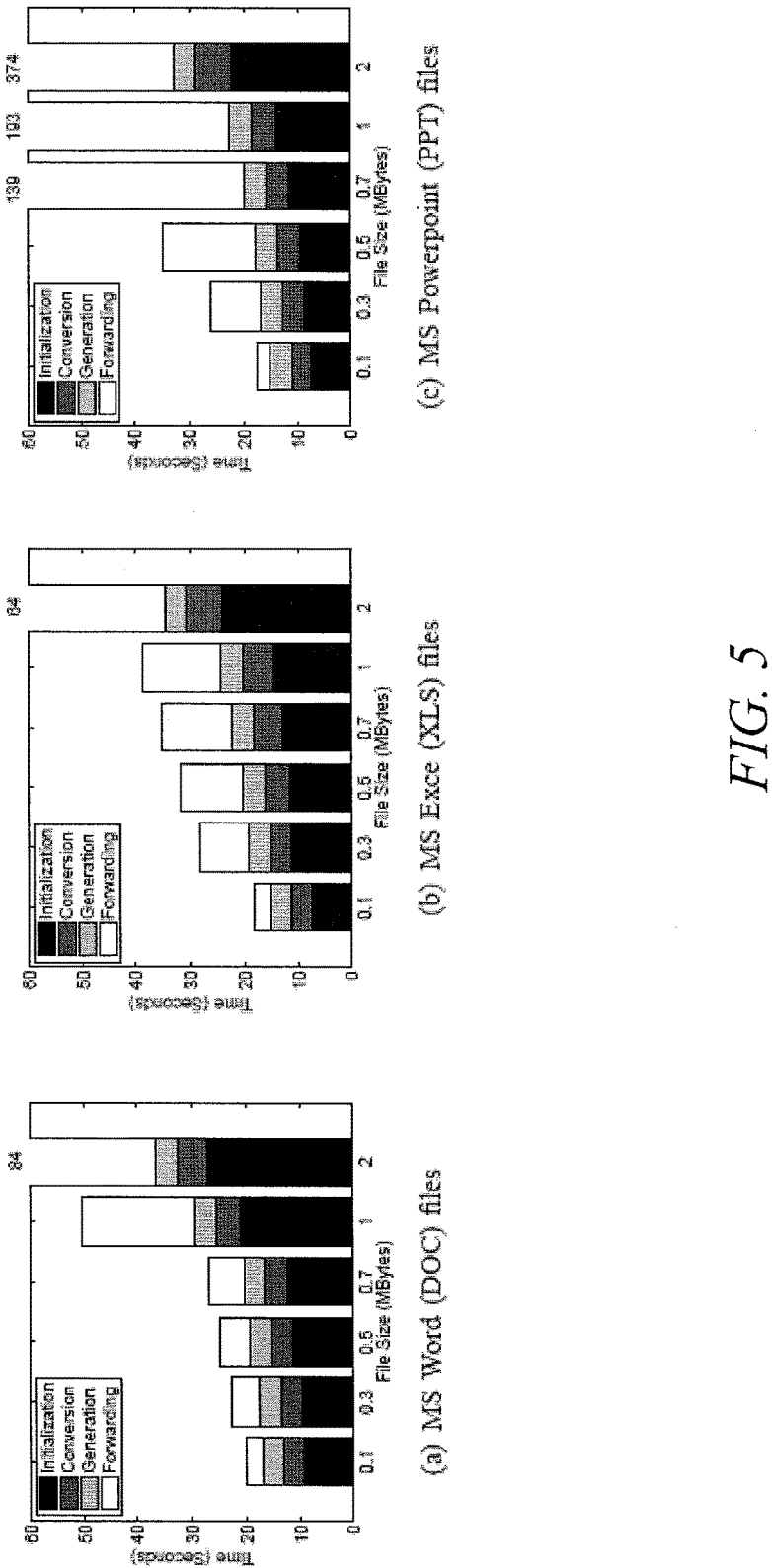
FIG. 5 illustrates graphs of time dissolution of subprocedures for basic file types according to an embodiment of the subject matter described herein.

First, we evaluate the end-to-end operation time of the system. From the user's point of view, the operation time that he or she may go through using the system might be the most important performance metric. Analyzing time portion taken by different operations helps identify the performance bottleneck of the system. We split the total printing time into four time intervals as shown in FIG. 5, and summarize them in Table II. The initialization time represents the total time from the moment a print request is initiated by a user to the moment that a cloud server receives the file to print and the printer information. File conversion time denotes the time taken for converting an advanced file format to a basic file format. For instance, when the server gets an advanced file format such as PPTx (Microsoft PowerPoint), it asks conversion module of file handler 214 running on a virtualized Windows machine to convert it to a PDF file. Virtual machine and platform specific application are used to assure indistinguishable quality in the print jobs. Applications not dedicated to a file format may also give print outs but the details such as layout, styles, and font are not comparable with the one printed out from the genuine application. Note that the file conversion time is optional. More general file formats such as PDF, PS, JPG, GIF, and TXT do not require any conversion. Stream generation time is measured from the time when a print command is committed to the time when the server generates a complete print stream. Stream forwarding time is the time duration from the moment the first stream packet is sent by the server to the time when the printer has received the last packet. If compression is processed, compression and decompression time will be included in stream forwarding time. To get a clearer picture of the time distribution among all sub-procedures, we execute the first few measurements using an actual printer, HP LaserJet 4250, excluding compression and decompression procedures. Later on, we extend the measurement to over 1,000 printers for both cases with and without compression.

TABLE II

| Time Intervals | Representation |
| --- | --- |
| Initialization Time | $t_2-t_1$ |
| File Conversion Time | $t_3-t_2$ |
| Stream Generation Time | $t_4-t_3$ |
| Stream Forwarding Time | $t_5-t_4$ |
| Total Print Time | $t_5-t_1$ |

Time intervals divided for each major communication sequence during the CloudBridge operation We measure the time consumption of each sub-procedure using various file types which we classify into two major groups, basic and advanced file formats. Text, PDF and PS files fall into the basic group and Microsoft Word, Excel, and PowerPoint files are categorized as the advanced group demanding conversion.

Figure 4:
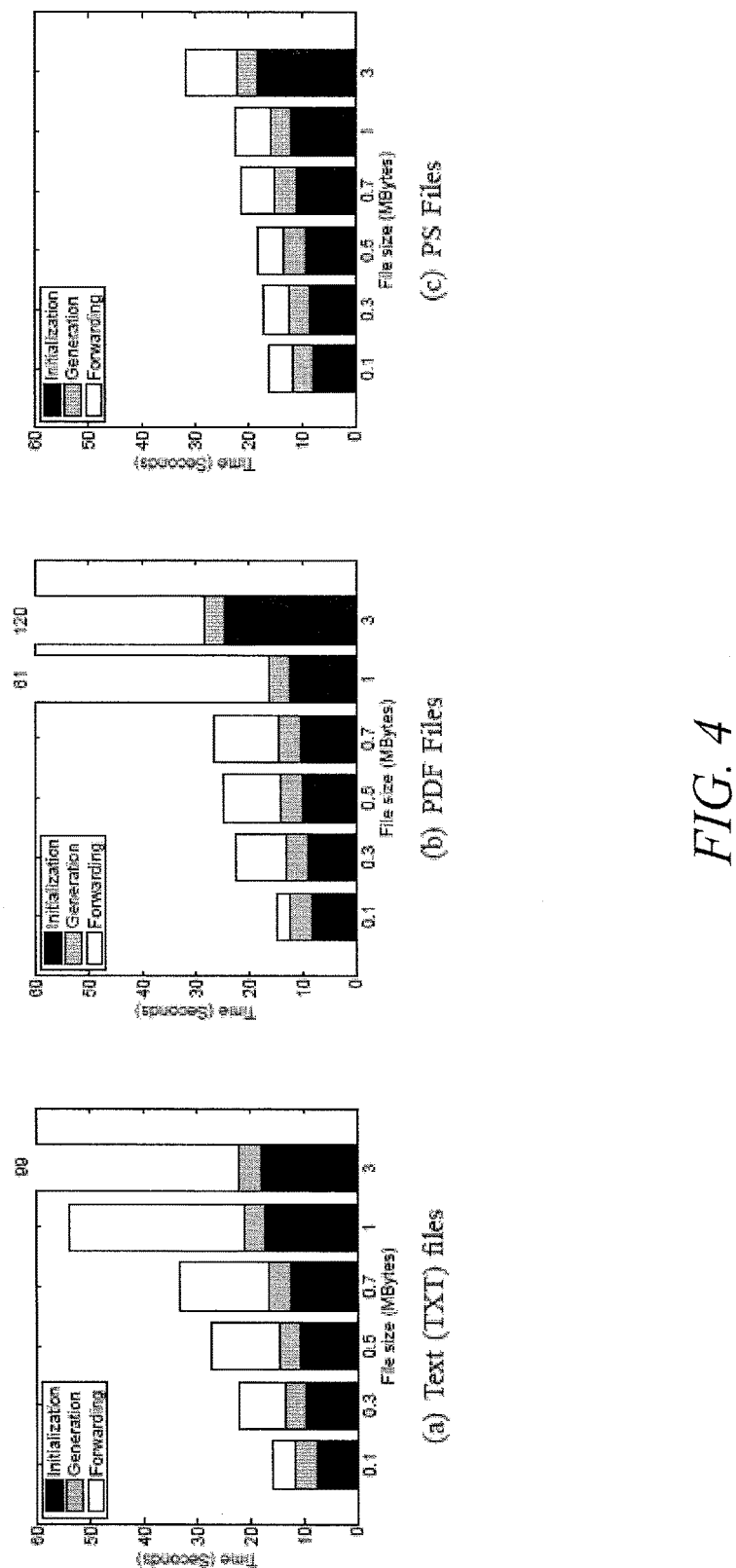
FIG. 4 illustrates graphs of time dissolution of subprocedures for basic file types according to an embodiment of the subject matter described herein.

FIG. 4 shows the time distribution measured from the basic group. It clarifies that the initialization and forwarding time for all three file types in the basic group are linearly increasing along with file size. This is intuitively understandable as these two metrics are pure networking transfer time, which is highly dependent on the data size. Since the print stream is larger than the original file, the stream forwarding sub-procedure takes longer than the initialization. For instance, the forwarding time is 4.3 times longer than the initialization time for a 5 MB test file, and 5 times longer than the initialization for a 2 MB PDF file. An exception is the PS file as shown in FIG. 4 (*c*), which spends more time on initialization than forwarding, e.g., initialization time is 1.5 times longer than forwarding time for a 4 MB PS file. This is because PS file format is already quite close to the print stream format, therefore the stream size is almost the same as the original file. When the file size is similar, the initialization time can take longer because of the asymmetry in uplink and downlink bandwidth of an Internet connection. The initialization time is mostly involved in file uploading whereas the stream forwarding is in fact a downloading process.

Similar results are observed for the advanced group as shown in FIG. 5. The initialization and the stream forwarding time are again linearly correlated with the file size, while the conversion time is also positively correlated to file size, but not linearly. Despite the fact that the stream forwarding time is linear with file size for a certain file type, stream forwarding time varies highly across file types. For instance, when printing a 1 MB file, the stream forwarding time for PowerPoint file (about 300 seconds) is much longer than those for Word (about 25 seconds) and Excel files (about 15 seconds). This resulted from the larger complexity embedded in PowerPoint files. PowerPoint files usually contain a lot of graphical contents, such as images, tables, and equations, which contribute to generate much larger print stream. Specifically, we find that the stream forwarding time becomes a dominant factor for advanced file types, especially for complex file types, such as PPT. This finding motivates our approach of data compression, which is discussed in detail in Section 4.

For both groups of file types, an interesting finding is that the stream generation time is almost constant disregarding file sizes and file types. More importantly, it is negligible comparing to the time consumption of other sub-procedures. From the measurement, we can conclude that the stream forwarding time dominantly determines the user experience on printing time. As we pointed out previously, the stream forwarding time is affected by both the stream size and current network bandwidth. Next, we investigate which factors impact on the stream size.

B. Stream Size Analysis

In this analysis, we specially focus on inflation factor (IF) that is defined as the ratio between the size of the stream and the size of the original file. We investigate two major factors determining IF value, file type and printer type and quantify their impacts on IF values in various settings.

1) IF vs. File Size and Type:

We first verify the impact of file type to IF values through an actual printer, HP LaserJet 4250. PCL 6, which generates smaller print streams than any other version, is applied in HP 4250 printer driver. We test several file formats such as TXT, PDF, and PPT and investigate the correlation between the original file size and the corresponding stream size with a data set of about 100 files per each format. We observe that TXT files show strong correlation between the stream size of original file size, with a correlation coefficient of 0.99 while the average IF is around 10. This is intuitive as TXT format is so simple that interpretation overhead will monotonically increase as the original file size increases. PDF files give a quite low correlation coefficient, 0.99, and an average IF of 3. This is possibly due to the fact that PDF files usually contain many graphics which is not aligned thus leads to various stream sizes. The results also show that even with a high level printer language, e.g., PCL 6, the IF values fluctuate from 2 to 10 on average. We subsequently present more of a detailed investigation on IF values for over 1,000 printers from all major printer manufactures.

Figure 6:
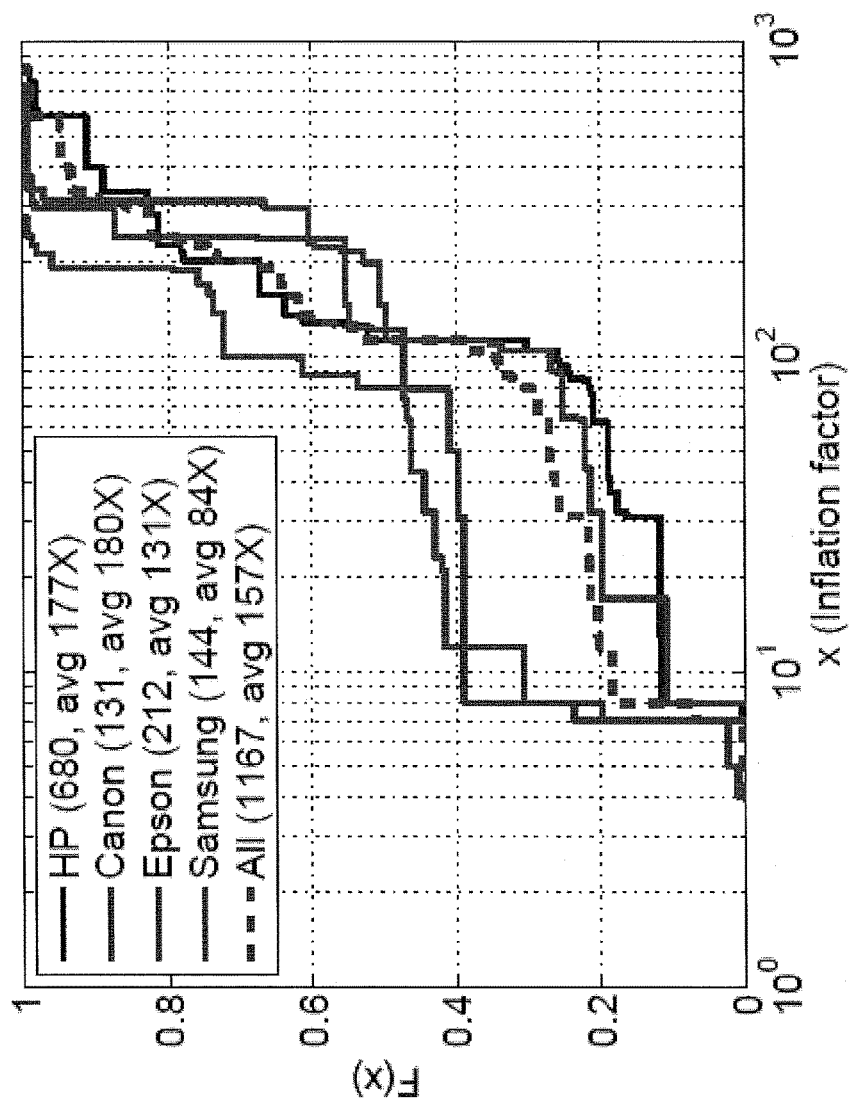
FIG. 6 is a graph illustrating inflation factors for a text file. The inflation factors (IFs) can be categorized into three types: Small: (IF=10), medium (IF=100) and large (IF=100), which were apparently shown by the steep increase section. Each manufacturer has different distributions of the inflation factors.

2) IF vs. Printer Type:

To investigate the generalized IF for various printers, we emulate aforementioned 1,167 printers whose drivers are installed in our cloud server. FIG. 6 shows CDFs (cumulative distribution function) of IF values for major manufacturers. From the test results using a text file of the size 1 KB, we observe that HP LaserJet 4250 shows an IF of 8.8 and the other printers give IF values widely varying from 2 to 700. Our results indicate that the IFs are typically large. Only 20% of printers show IF values less than 10, while more than 40% shows IF values larger than 100. We also verify that small IF values less than 10 mostly come from printers with PCL 6, as PCL 6 adopt smaller and more compact commands than previous versions. On the other hand, higher IF values larger than 100 come from printers using previous PCL versions. It is natural to get a very large stream size when using low PCL version such as PCL 5 or 4, because they are originally designed to convert a file into a raster image, which expresses a content on a paper using a bit sequence. For instance, when a printer only supports black and white color mode, 1 in the bit sequence corresponds to a black dot and 0 corresponds to no dot. In this representation, even a single character requires a large number of dots, thus leading to a large stream even when the file content is quite simple.

Figure 7:
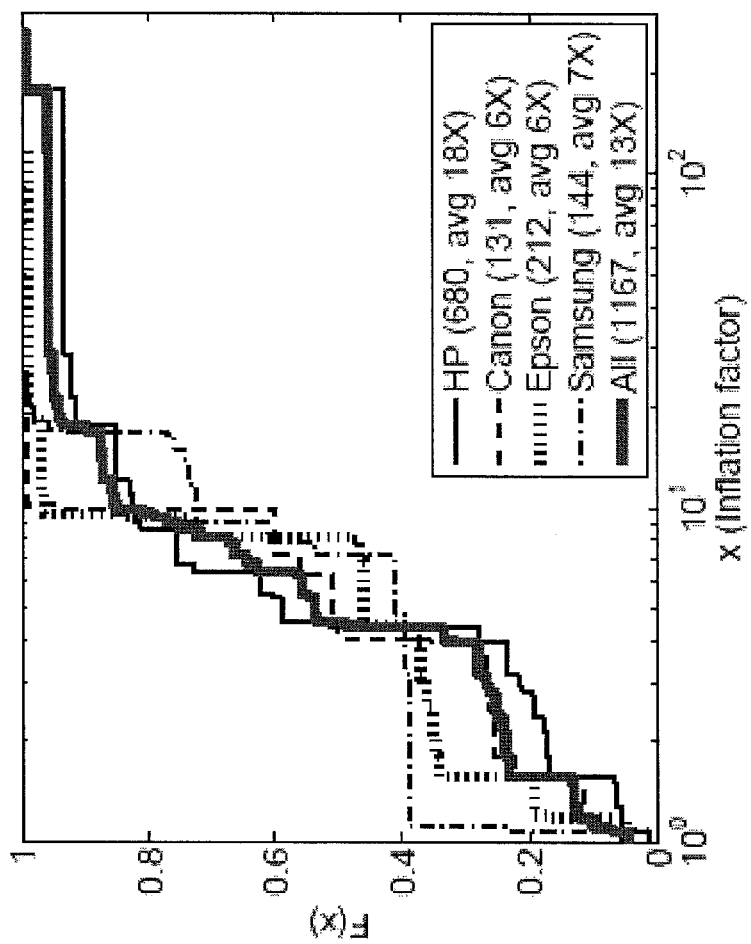
FIG. 7 is a graph of inflation factors for a postscript file. The average IF is much smaller than that for a text file. Over 80% of the printers generate print streams smaller than ~10× of the original file size. As the postscript (PS) file type is based on a printer-friendly language, print streams generated from PS file have low IF, which can be considered as a lower bound of IF.

FIG. 7 shows experimental results using different file type, PS, which gives lower average IF values compare to TXT file type. Over 80% of the printers generate print streams smaller than ~10× of the original file size. Based on our observation, print streams generated from PS files have low IF due to the nature of file type which relies on a printer-friendly language. IF for PS files can be considered as lower bound of IF.

However, one should note that higher versions of PCL do not always guarantee a lower IF. According to a technical report from HP [8], there are several cases where lower PCL versions give smaller IF than higher PCL versions. The difference comes from the characteristics of the languages. Higher PCL versions remembers the objects as vectors whereas lower PCL versions record the locations of dots.

4. COMPRESSION DECISION FUNCTION

Figure 8:
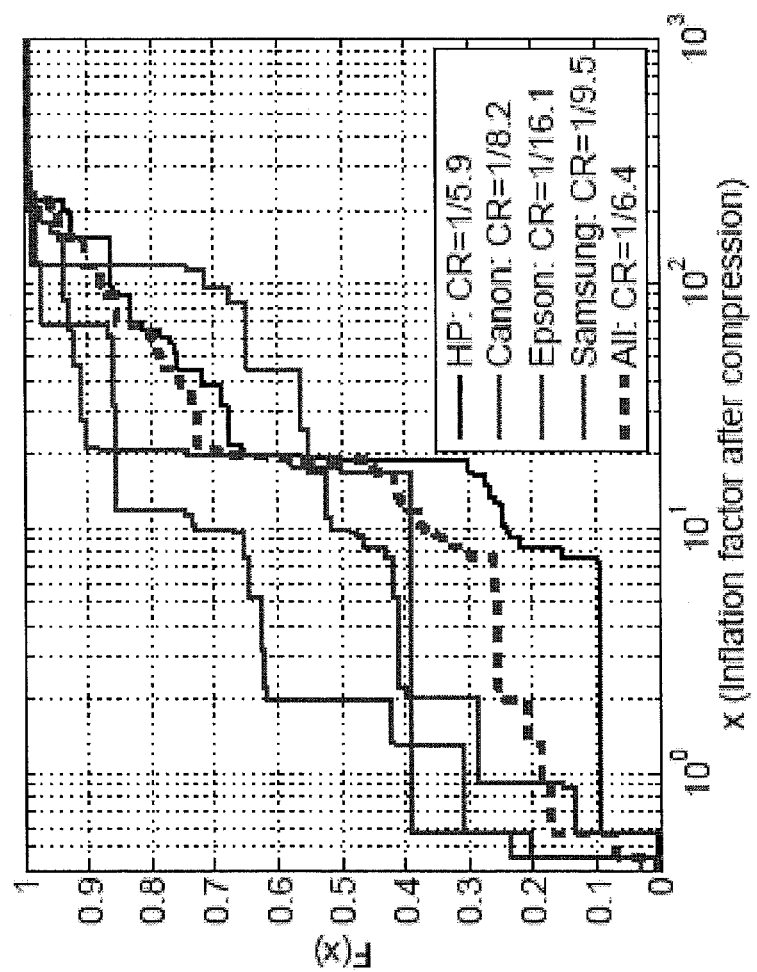
FIG. 8 is a graph of inflation factors after applying a compression scheme. Inflation factors after applying the compression scheme can be still categorized into three sets, but with decreased inflation factors: small IF (less than 1), medium IF (~20) and large IF (~100). Over 70% of the total print streams have IF values less than 20 after compression, which can be interpreted as a tolerable traffic inflation.

Recall that our aim is to enable printing from smart devices, the large IF values of various printers however, limits the practicality of the system. To further optimize the performance, we consider to adopt a compression technique for the print stream. Among various lossless compression techniques in the literature, we focus on PPM (Prediction by Partial Matching) algorithm which is theoretically proven to be optimal in the compression ratio [15]-[18], where the compression ratio is defined by the size of the original data and the compressed data. FIG. 8 shows the IF values from the same set of printers for the same text file used in FIG. 6 after applying PPM compression. On average, we get a compression ratio of 10 which indicates that the stream size reduced to $\frac{1}{10}$. Beneficial from the high compression ratio, only 30% out of 1,167 printers have IF values of 20 or higher after compression. Particularly, only 10% of Samsung printers give IF values larger than 20 as they are applying higher version of PCL than printers from other manufactures. Compression of the print stream, despite the obvious benefit, could also degrade the performance since compression and decompression take time and the decompression operation on a smart device is computation-intensive, leading to high energy consumption.

A. Decision Function Design

To determine whether to compress the stream or not, we design a decision function configured to operate on cloud server 106 side. More particularly, as set forth above, the compression decision function may be implemented by stream handling module 212 of CloudPrint daemon 104. The decision function is designed to optimize user experience in terms of the total print time and the energy consumption of a smart device based on the parameters listed in Table III. We model each of the parameters using a few independent variables and create decision criteria for the print time and the energy consumption. Note that the modeling process is embedded in CloudBridge application 100 and CloudBridge daemon 104. When users of a specific smart device model run CloudBridge service multiple times, our system aggregates the log data and trains the models automatically. Once the system collects enough training data, it stops collecting data and starts applying the decision criteria calculated from the models.

TABLE III

| Variable | Meaning |
|---|---|
| x | Generated print stream size (MB) |
| $B_d$ | Downlink bandwidth (Mbps) |
| $x_c$ | Compressed print stream size (MB) |
| $t_c$ | Compression time on the server (second) |
| $t_d$ | Decompression time on Android (second) |

Parameters and their units used in decision function modeling. We consider x and $B_d$ as independent variables and model other parameters using independent variables.

Figure 9:
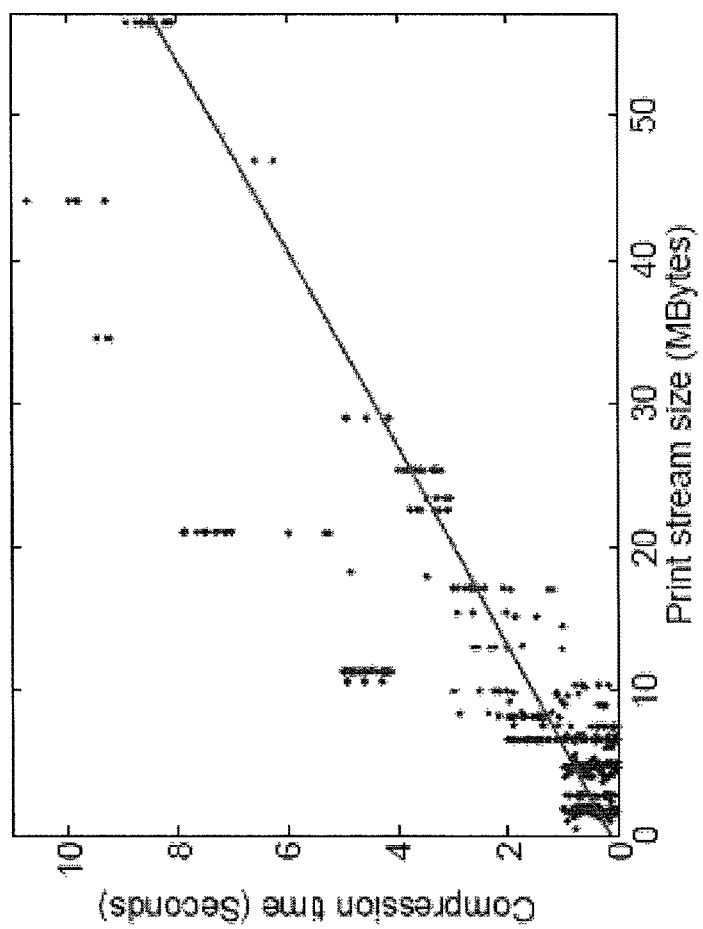
FIG. 9 is a graph of compression time versus print stream size on the server. In particular.
Figure 10:
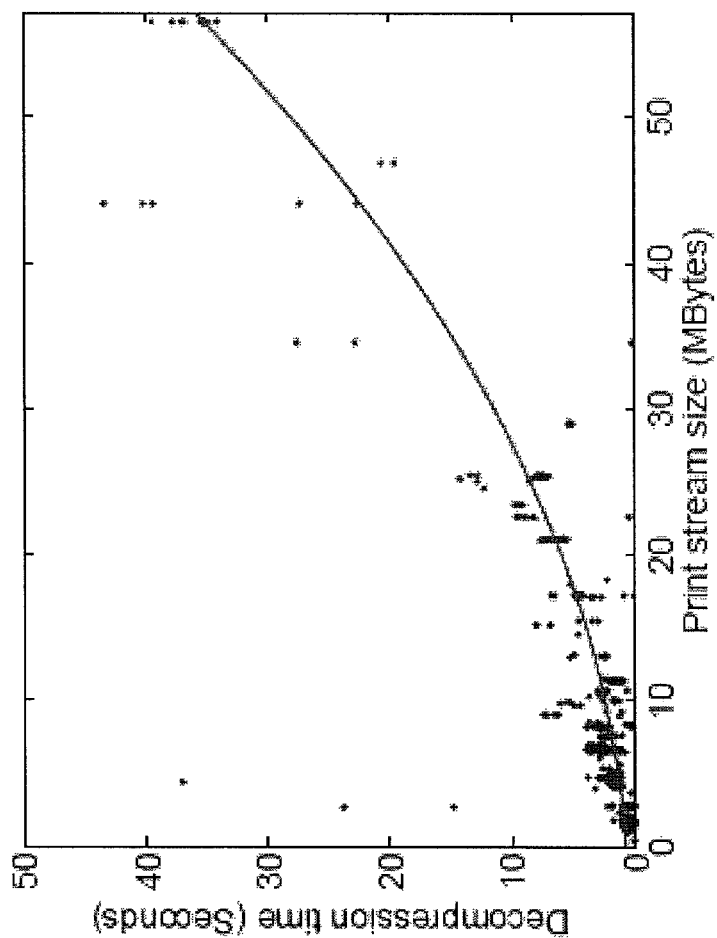
FIG. 10 is a graph of decompression time versus print stream size for the CloudBridge application running on an Android device. In particular.
Figure 11:
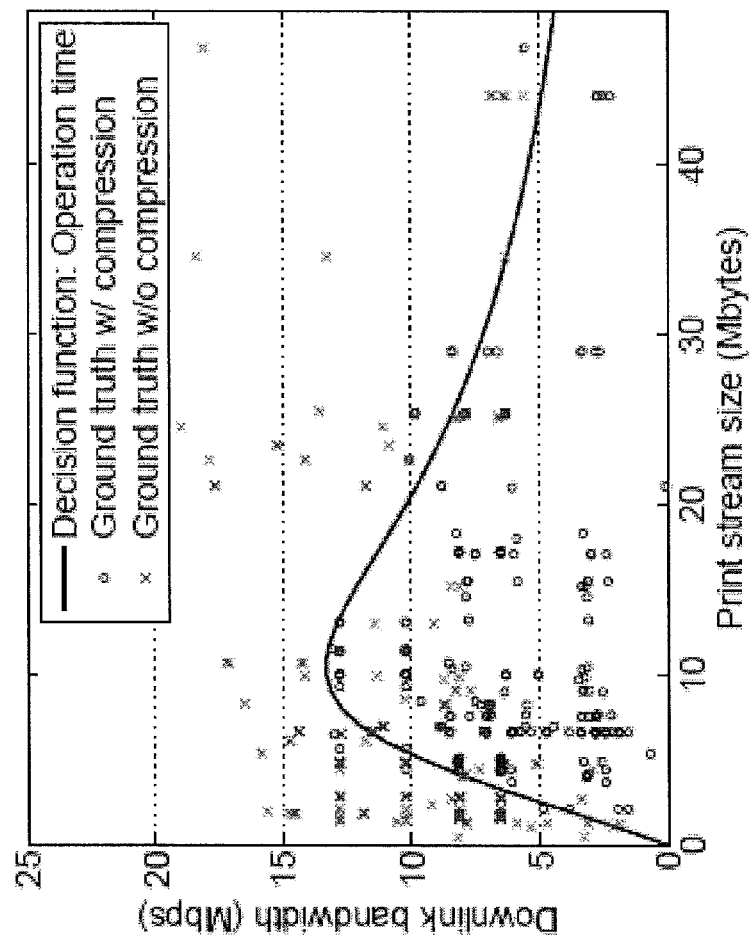
FIG. 11 is a graph of the compression decision function based on the end-to-end operation time plotted on the ground truth values. The mark ° stands for the ground truth value which performs better using compression, and x indicates the case with no compression scheme.

We first model the compression time $t_c$ at cloud server 106 and the decompression time $t_d$ at smart device 102. FIGS. 9 and 10 show the measurement results from about 100 experimental runs with various files. The figures also show the best fitting regression equations for the measurement results. For an arbitrary stream size x, a Linux server with Intel Quad-core i7 CPU shows $t_c=1.45e^{-4}x^2+0.1379x+0.1464$. A smart device, the Samsung Galaxy S II shows $t_d=9.51e^3x^2+7.26e^{-2}x+0.7218$. The size of the compressed stream, $x_c$ becomes 0.5x on average. Note that the compression ratio becomes smaller than the ratio shown in FIG. 8, because of the limited capability of a PPM library for Android smart devices. The compression ratios shown in FIG. 8 can be considered as upper bounds of PPM method.

We measure the downlink bandwidth between the server and the Android device using probing packets at the beginning of the print stream transfer. A small portion of print stream is used for the bandwidth probing, If the server decides not to use the compression, then it transmits the rest of the raw print stream. Otherwise, it compresses the rest and transmits the compressed print stream with an indicator that notifies smart device 102 that the print stream is compressed.

1) Total Print Time:

We derive a decision function for the total print time indicating the time taken for end-to-end operation. Eq. 1 shows the function determining whether to compress or not based on the total print time. The inequality inside the indicator function represents the total print time when the compression is applied (right side) or not (left side). Note that the time for common sub-procedures, e.g., initialization and stream generation, are cancelled out at both sides. Applying regression equations for $t_c$, $t_d$, and $x_c$ simplifies the decision criteria and gets to Eq. 2. According to the simplified decision criteria, for a given stream size x, when the downlink bandwidth $B_d$ is lower than the value of $0.5x/(0.020137x^2-0.11958x+2.188)$, compression is recommended. This implies that when the downlink bandwidth is very high, sending a large print stream without compression provides better performance as it eliminates the compression and decompression time.

$$I\left(\frac{x}{B_d} > \frac{x_c}{B_d} + t_c + t_d\right) = \begin{cases} 1 : \text{Compression} \\ 0 : \text{No compression} \end{cases} \quad (1)$$

where I(•) denotes for the indicator function.

$$I\left(B_d < \frac{0.5x}{0.020137x^2 - 0.11958x + 2.188}\right) = \begin{cases} 1 : \text{Compression} \\ 0 : \text{No compression} \end{cases} \quad (2)$$

We plot the decision function and ground truth data from a large number of experimental runs. To collect ground truth data, we configured a cloud server to always compress the stream and a smart device to decompress the stream. By collecting the timing information when the compression is applied, we can easily infer what will be the total print time in the case where the compression is not applied. Note that CloudBridge application 100 is designed to report the collected timing information to the server when printing is not performed. We mark the ground truth to be o or x in the plot. The mark o stands for the ground truth where the compression gives shorter print time while x indicates the opposite case. The o marks over the decision criteria line are considered as false negatives (FNs) and the x marks below the criteria are regarded as false positives (FPs).

Figure 12:
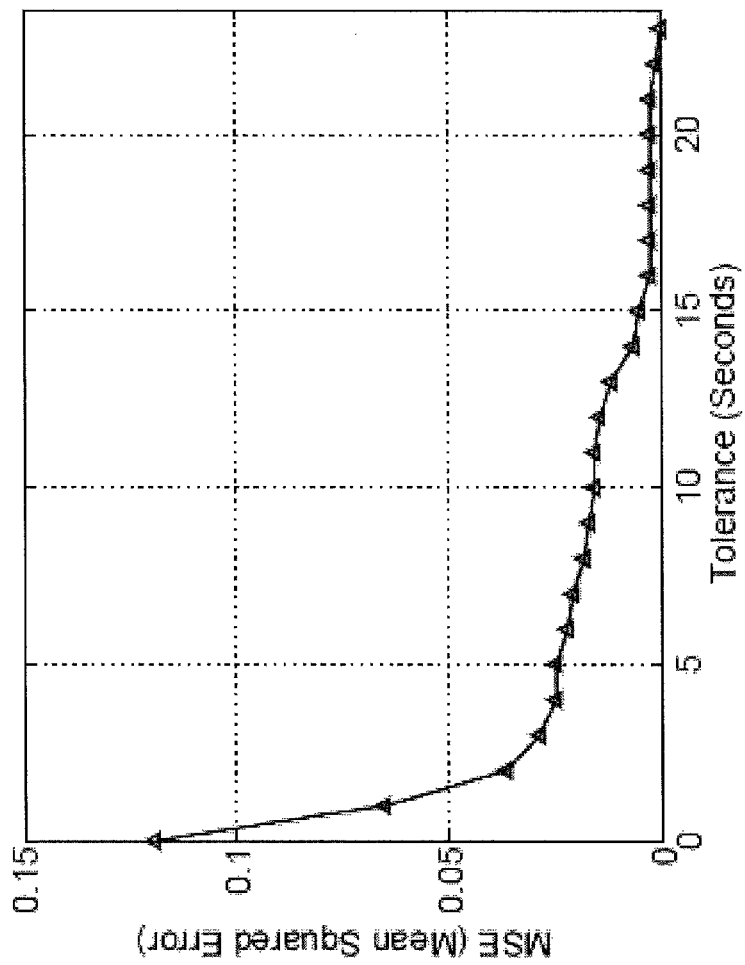
FIG. 12 is a graph of mean squared error for the compression decision function considering the end-to-end operation time. When users allow about 2 seconds of tolerance, the decision function gives over 95% of accuracy.

We evaluate the accuracy of the decision criteria using FPs and FNs from ground truth data. For more practical evaluation, we define tolerance as a threshold value of the difference between the total print time with and without compression. We apply the tolerance to mitigate the strictness of FPs and FNs. For instance, when the tolerance is 1 second, we do not consider ground truth data having less than 1 second of difference in total print time as FPs or FNs. When the tolerance becomes 0, FP and FN follow their conventional definition. The accuracy is measured by a well-known metric, mean squared error (MSE) that averages out the squared errors for each incident. In our case, when FP or FN happens, we consider the error is 1 and is 0 otherwise. FIG. 12 shows the MSE of our decision criteria for various tolerance values. The figure tells that when users allow 5 seconds of tolerance, our decision criteria gives MSE of 0.024, telling that the decision is correct for about 97.6% of the trials.

Figure 13:
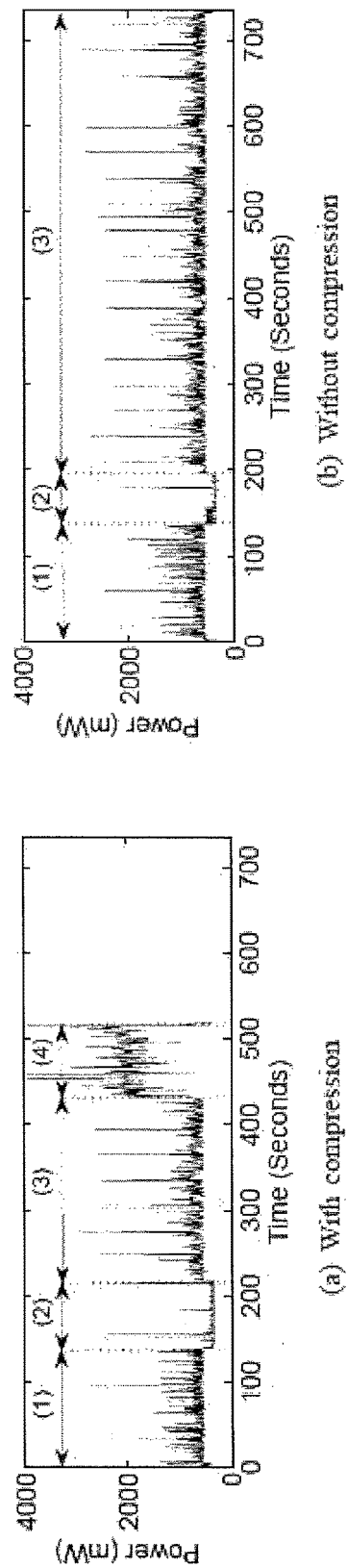
FIGS. 13(a) and 13(b) are graphs of power consumption measured on the Android device (Samsung Galaxy S II) using a Monsoon power meter. (a) Plots the operation using compression and is divided into 4 operation times. Operation times (1)-(4) represent file transmission time, idle time, stream receiving time, and decompression time, respectively. Each operation drains different power: the decompress operation consumes higher power compared to data transfer over the network. (b) Shows the operation without the stream compression.

2) Energy Consumption on Android:

We also design decision criteria in the aspect of energy consumption in a smart device. Designing a decision function for energy consumption requires measurements on average power consumption for each of operations in the smart device. The current smart devices have no ability to measure the accurate power consumption from the device, so we measure the power using a digital power meter from Monsoon [11]. FIG. 13 illustrates measurement results of running the CloudBridge application on an Android smart phone, Samsung Galaxy S II. FIG. 13 (a) represents the operation using compression while FIG. 13 (b) shows the result without compression. We measure the power level from the beginning of the operations until the device forwards the received stream to the local printer. Due to the redundancy, we omit the forwarding operation in the result. (Forwarding the stream from device to printer consumes the same time and power in both cases.) As shown in the graph, power consumption during data transmission and reception are high. From more than 10 times of runs, the average of $P_r$ is measured to be 717 mW. The average of $P_t$ is measured to be 415 mW. The power consumption while decompressing the stream is much higher. $P_d$ is measured to be about 2014 mW on average. It is important to note that the power consumption values may vary for different models of smart devices as they use diverse processors and WiFi modem chipsets. Hence, the decision criteria requires a set of power consumption values from different states per smart device. Table IV gives the measurement results for three different Android devices and shows diversity of the power level consumed on each device.

TABLE IV

| Device | $P_i$ | $P_r$ | $P_d$ |
|---|---|---|---|
| Samsung Galaxy S II | 415 mW | 717 mW | 2014 mW |
| LG G2x | 315 mW | 760 mW | 963 mW |
| HTC Evo Shift | 243 mW | 574 mW | 714 mW |

Average power level measured for each operation period on three different Andriod devices.
$P_i$, $P_r$, and $P_d$ denote for average power for idle state, data reception, and decompression, respectively.
Note that Samsung Galaxy S II with a dual core pocessor consumes much higher power than others during decompression.

Once the average power consumptions are obtained, we can apply the values to the operation times to get a decision function on energy consumption, Eq. 3. A simplified criteria is given at Eq. 4, which determines whether to compress or not using $B_d$ and x.

$$I\left(\frac{x}{B_d}\int P_r(t)dt > \frac{x_c}{B_d}\int P_r(t)dt + t_c\int P_i(t)dt + t_d\int P_d(t)dt\right) = \begin{cases} 1: \text{Compression} \\ 0: \text{No compression} \end{cases} \quad (3)$$

$$I\left(B_d < \frac{350x}{34.76596x^2 - 173.5292x + 2991.62}\right) = \begin{cases} 1: \text{Compression} \\ 0: \text{No compression} \end{cases} \quad (4)$$

Figure 14:
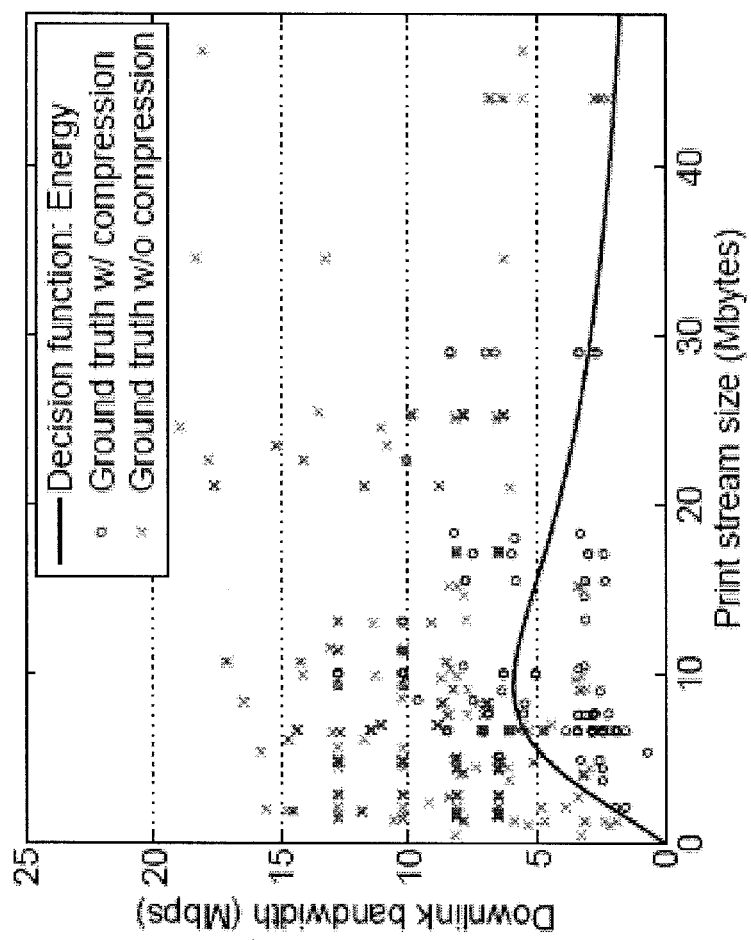
FIG. 14 is a graph of compression decision function based on energy consumption on an Android device. The compression decision function in FIG. 14 suppresses utilization of the compression scheme, as decompression operation in Android consumes higher power compared to data transfer.
Figure 15:
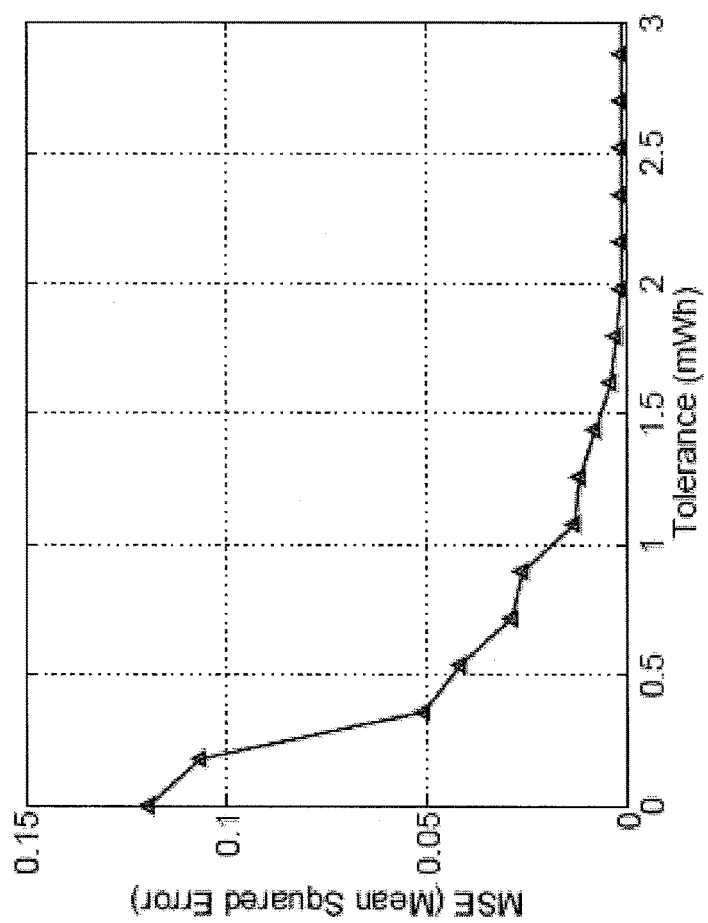
FIG. 15 is a graph of mean squared error for compression decision function considering the energy consumption on the Android device. If a user can tolerate about 0.5 mWh of energy difference, the decision function makes only 4.1% errors.

Experimental results showing the ground truth data along with the decision criteria are illustrated in FIG. 14. FIG. 15 again shows the MSE for various tolerance values represented in mWh. The graph indicates that if a user can tolerate 0.5 mWh of energy difference, the decision function makes only 4.1% errors over 770 trials. 0.5 mWh corresponds to 0.01% of the total battery capacity of a typical smart phone (e.g., 5000 mWh).

B. Decision Making

Figure 16:
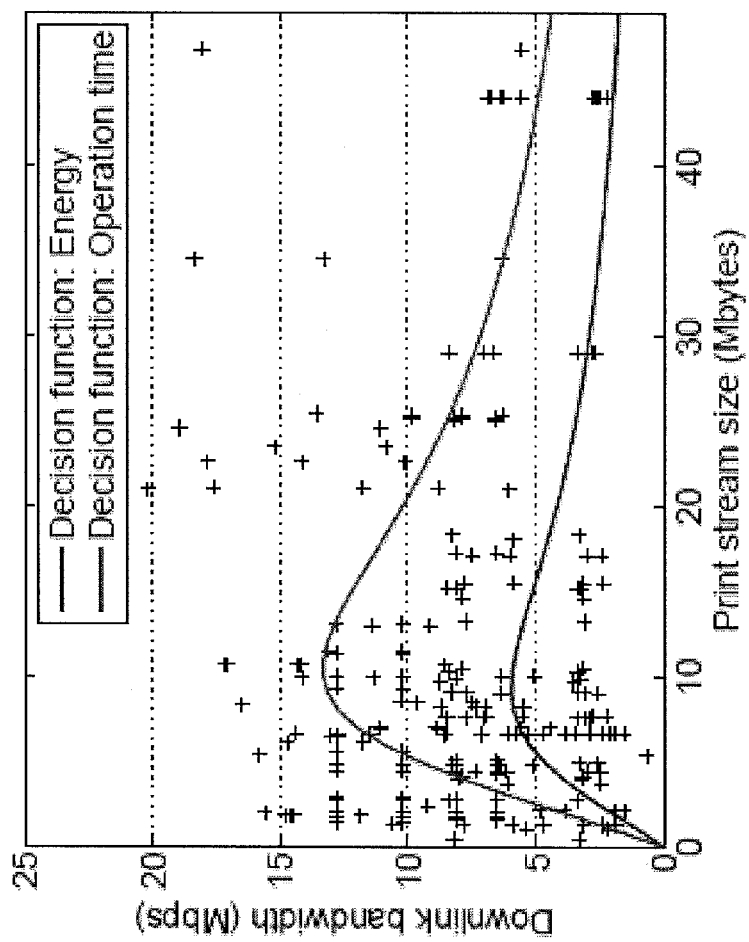
FIG. 16 is a graph of the experiment set is divided into three groups according to two decision functions. From the bottom of the graph, the first level represents the cases which definitely perform better using compression considering both operation time and the power.

According to the error ratio of two decision functions, Eq. 2 and Eq. 4, our decision functions turn out to give highly accurate predictions. Here we discuss the decision making for both criteria at the same time. When we overlap the decision functions together as shown in FIG. 16, it interestingly classifies the regions into 3 cases. When $B_d$ and x fall into the cases included in the lower region or the upper region, the decision making becomes easy. In those regions, the compression benefits both time and energy at the lower region whereas no compression benefits both in the upper region. The region in the middle is equivocal. The compression gives a benefit to the total print time, but gives a penalty to the energy. This is due to the nature of print stream which gives large variance depending on the file type, file size and the printer type. To avoid confusion of the system, we put a preference field in the CloudBridge application, which asks a user about her preference on energy and time. Our decision functions in the cloud server fetch her preference from the application to provide the best experience to the user, even for the equivocal regions.

5. CONCLUSION

As described above, the subject matter described herein includes a cloud-powered system, CloudBridge enabling peripheral support on smart devices. To prove the concept, we focus on printing from smart devices. CloudBridge is universally applicable to all smart devices and all networked printers or other network-accessible peripherals and is completely independent from personal computers. More importantly, it also provides indistinguishable experiences (i.e., quality of print outs) to smart devices users from that of conventional computers.

For practicality, we adopt decision functions to our system, optimizing performance metrics closely related to user experiences such as total print time and energy consumption in smart devices. Through extensive measurements and training from the measurement data, the decision functions are shown to provide accurate decisions on whether to compress data or not with more than 95% of probability.

The CloudBridge system architecture relying on cloud servers for the intelligence of interpreting languages to communicate with peripherals has high flexibility and scalability by its nature. We expect our system architecture brings more practical solutions to smart devices helping such devices overcome functional limitations over conventional computers.

As stated above, the subject matter described herein may be used to interface with printers without requiring driver software on the smart device. However, the subject matter described herein is not limited to interfacing with printers. Other types of peripherals that the subject matter described herein may be used to interface with include fax machines, scanners, wireless mice, and cameras.

In addition, the subject matter described herein is not limited to relaying the data directly to the peripheral. For example, in an alternate implementation of the subject matter described herein, the application on one smart device may relay the print data to an application on another smart device for storage or for direct interfacing with a peripheral, such as a printer.

According to another aspect of the subject matter described herein, the peripheral and the mobile device desiring to access the peripheral may be located behind a firewall or network address translator (NAT). In such a case, the server may communicate with the mobile device through the firewall using a pinhole created by connection between the mobile device and the server.

REFERENCES

The disclosure of each of the references below is incorporated herein by reference in its entirety:

[1] Amazon Web Services, Amazon Elastic Compute Cloud (Amazon EC2). http://aws.amazon.com/ec2/.
[2] Apple Inc., AirPrint. http://www.apple.com/iphone/features/airprint.html.
[3] Business Insider, Smartphone Sales Will Dwarf PC Sales This Year And Reach A Staggering 1.5 Billion Per Year By 2016. http://www.businessinsider.com/.
[4] Canalys, Smart phones overtake client PCs in 2011. http://www.canalys.com.
[5] Epson, Connect. http://www.epson.com,
[6] Google, Cloud Print. http://www.google.com/cloudprint.
[7] HP, ePrint. http://www.hp.com/ePrint.
[8] HP Support Document, Printing Comparison of PCL 5 Printers vs, HP Inkjet PCL 3 Plus Printers. http://h20000, www2.hp.com/bizsupport/.
[9] IDC, The worldwide hardcopy peripherals tracker. http://www.idc.com/tracker/showtrackerhome.jsp.
[10] Kodak, Hero Printers. http://www.kodak.com.
[11] Monsoon Solutions Inc. Power Monitor. http://www.m-soon.com/LabEquipment/PowerMonitor/.
[12] PrinterShare, Mobile Printing. http://printershare.com.
[13] Samsung, MobilePrint. http://www.samsung.com.
[14] The Guardian, How the smartphone is killing the PC. http://www.guardian.co.uk/technology/.

[15] I.-C. K. Chen, J. T. Coffey, and T. N. Mudge, Analysis of branch prediction via data compression. ACM SIGOPS Operating Systems Review, 30:128-137, December 1996.
[16] J. Cleary and I. Witten. Data compression using adaptive coding and partial string matching. Communications, IEEE Transactions on, 32(4):396-402, April 1984.
[17] A. Moffat. Implementing the ppm data compression scheme.
Communications, IEEE Transactions on, 38(11):1917-1921, November 1990.
[18] J. S. Vitter and P. Krishnan. Optimal prefetching via data compression. Journal of the ACM (JAC*, 43:771-793, September 1996.

What is claimed is:

1. A method for accessing a service from a peripheral device using a mobile device, the method comprising:
   discovering, by an application on the first mobile device, a peripheral from which a user of the first mobile device desires to access a service;
   transmitting, by the application on the first mobile device, a file generated on the first mobile device to a server;
   at the server, converting the file into a content stream compatible with the peripheral, determining, based on available network bandwidth and a size of the content stream, whether or not to compress the content stream, and transmitting the content stream or the compressed content stream to the first mobile device, wherein the server includes a compression decision function that determines whether or not to compress the content stream using an indicator function derived from one of:
      whether, given the available network bandwidth and the size of the content stream, a modeled total print time for the content stream without compression of the content stream exceeds a modeled total print time for the content stream with compression of the content stream; and
      whether, given the available network bandwidth and the size of the content stream, a modeled energy consumption of the first mobile device without compression of the content stream exceeds a modeled energy consumption of the first mobile device with compression of the content stream;
   receiving, by the application on the first mobile device, the content stream or the compressed content stream from the server to be delivered to the peripheral and for which the service is to be invoked;
   performing, by the application on the first mobile device, header assembly or decompression of the content stream; and
   relaying, by the application on the first mobile device, the content stream to the peripheral or to a second mobile device.

2. The method of claim 1 wherein the peripheral comprises a printer and the service comprises a print service.

3. The method of claim 1 wherein the peripheral comprises a one of: a fax machine, a scanner, a wireless mouse, and a camera.

4. The method of claim 1 wherein the application connects with the server and the peripheral or the second mobile device via TCP connections.

5. The method of claim 1 wherein the peripheral and the first mobile device are located behind a firewall or a network address translator (NAT) and wherein the server communicates with the mobile device through the firewall using a pinhole created by a connection between the mobile device and the server.

6. The method of claim 1 wherein relaying the content stream to the peripheral or to the second mobile device includes relaying the content stream to the second mobile device, and from the second mobile device to the peripheral.

7. The method of claim 1 wherein the first and second mobile devices each comprise a mobile handset.

8. The method of claim 1 wherein receiving a content stream includes receiving a compressed content stream from the server.

9. A system for accessing a service from a peripheral device using a mobile device, the system comprising:
   a server including at least one processor and a memory and containing a driver for controlling a peripheral to provide a service; and
   an application configured to execute on a first mobile device for discovering the peripheral from which a user of the first mobile device desires to access the service, for transmitting a file generated on the first mobile device to the server, wherein the server converts the file into a content stream compatible with the peripheral, determines, based on available network bandwidth and a size of the content stream, whether or not to compress the content stream, and transmits the content stream or a compressed content stream to the first mobile device, wherein the server includes a compression decision function that determines whether or not to compress the content stream using an indicator function derived from one of:
      whether, given the available network bandwidth and the size of the content stream, a modeled total print time for the content stream without compression of the content stream exceeds a modeled total print time for the content stream with compression of the content stream; and
      whether, given the available network bandwidth and the size of the content stream, a modeled energy consumption of the first mobile device without compression of the content stream exceeds a modeled energy consumption of the first mobile device with compression of the content stream; and
   wherein the application receives the content stream or the compressed content stream from the server to be delivered to the peripheral and for which the service is to be invoked, performs header assembly or decompression of the content stream, and relays the content stream to the peripheral or to a second mobile device.

10. The system of claim 9 wherein the peripheral comprises a printer, the service comprises a print service, and the server comprises a print server including drivers for controlling a plurality of different printers.

11. The system of claim 9 wherein the peripheral comprises one of: a fax, a scanner, a wireless mouse, and a camera.

12. The system of claim 9 wherein the first mobile device communicates with the server and the peripheral or the second mobile device via TCP connections.

13. The system of claim 9 wherein the peripheral and the first mobile device are located behind a firewall or a network address translator (NAT) and wherein the server communicates with the first mobile device through the firewall using a pinhole created by a connection between the first mobile device and the server.

14. The system of claim 9 wherein the application is configured to relay the content stream to the second mobile device and wherein the second mobile device is configured to relay the content stream to the peripheral.

15. The system of claim 9 wherein the first and second mobile devices each comprise a mobile handset.

16. A non-transitory computer readable medium having stored thereon executable instructions that when executed by the processor or a computer control the computer to perform steps comprising:
- discovering, by an application on a first mobile device, a peripheral from which a user of the first mobile device desires to access a service;
- transmitting, by the application on the first mobile device, a file generated on the first mobile device to a server;
- at the server, converting the file into a content stream compatible with the peripheral, determining, based on available network bandwidth and a size of the content stream, whether or not to compress the content stream, and transmitting the content stream or the compressed content stream to the first mobile device wherein the server includes a compression decision function that determines whether or not to compress the content stream using an indicator function derived from one of:
  - whether, given the available network bandwidth and the size of the content stream, a modeled total print time for the content stream without compression of the content stream exceeds a modeled total print time for the content stream with compression of the content stream; and
  - whether, given the available network bandwidth and the size of the content stream, a modeled energy consumption of the first mobile device without compression of the content stream exceeds a modeled energy consumption of the first mobile device with compression of the content stream;
- receiving, by the application on the first mobile device, the content stream or the compressed content stream from the server to be delivered to the peripheral and for which the service is to be invoked;
- performing, by the application on the first mobile device, header assembly or decompression of the content stream; and
- relaying, by the application on the first mobile device, the content stream to the peripheral or to a second mobile device.

* * * * *